(12) United States Patent
Lin et al.

(10) Patent No.: US 6,778,265 B1
(45) Date of Patent: Aug. 17, 2004

(54) COPY FEATURE FOR RECORDABLE DVD EDITING

(75) Inventors: Shu Lin, Indianapolis, IN (US); Mark Alan Schultz, Carmel, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 900 days.

(21) Appl. No.: 09/663,394

(22) Filed: Sep. 15, 2000

Related U.S. Application Data (60) Provisional application No. 60/164,793, filed on Nov. 10, 1999.

(51) Int. Cl.[7] .............................. H04N 5/85; G11B 5/86
(52) U.S. Cl. .......................... 356/125; 386/124; 360/15
(58) Field of Search .............................. 386/52, 94, 46, 386/124, 125, 126, 45, 40, 4, 1, 95; 360/13, 15, 32; H04N 5/85; G11B 5/86

(56) References Cited

U.S. PATENT DOCUMENTS

| | | | |
|---|---|---|---|
| 5,267,334 A | 11/1993 | Normille et al. | |
| 5,535,008 A | 7/1996 | Yamagishi et al. | |
| 5,862,110 A | 1/1999 | Yamamiya | |
| 5,870,523 A | 2/1999 | Kikuchi et al. | |
| 5,926,604 A | 7/1999 | Yanagihara et al. | |
| 5,937,136 A | 8/1999 | Sato | |
| 5,949,953 A | 9/1999 | Shirakawa et al. | |
| 5,970,205 A | 10/1999 | Nakamura et al. | |
| 5,999,696 A | 12/1999 | Tsuga et al. | |
| 6,009,229 A | 12/1999 | Kawamura | |
| 6,034,832 A | * 3/2000 | Ichimura et al. | ............... 360/60 |
| 6,658,198 B1 | * 12/2003 | Willis | .......................... 386/68 |

FOREIGN PATENT DOCUMENTS

| | | |
|---|---|---|
| EP | 0651391 | 5/1995 |
| EP | 0677961 | 10/1995 |
| EP | 0695098 | 1/1996 |
| EP | 0696798 | 2/1996 |
| EP | 0700221 | 3/1996 |
| EP | 0727912 | 8/1996 |
| EP | 0737975 | 11/1996 |
| EP | 0725399 | 7/1997 |
| EP | 0903744 | 3/1999 |
| EP | 0926903 | 6/1999 |
| EP | 0971535 | 1/2000 |
| WO | WO99/38166 | 7/1999 |
| WO | WO00/02195 | 1/2000 |

\* cited by examiner

*Primary Examiner*—Robert Chevalier
(74) *Attorney, Agent, or Firm*—Joseph S. Tripoli; Harvey D. Fried; Christine Johnson (57) ABSTRACT

A method for copying a recorded series of bits from a first location to a second location on a rewritable disc media. The method includes the steps of selectively marking a beginning point and an end point of a segment of the recorded series of bits, and a location to which said segment is to be copied prior tp said reading step. Subsequently, video data comprising at least a portion of the segment of the recorded series of bits to be copied is read from the disk and stored in a track buffer of a DVD device. At least part of the video data from the track buffer is subsequently transferred directly from the track buffer to the record buffer by a control processor of the DVD device. Finally, the portion of the video data stored in the track buffer is written to the second location.

12 Claims, 5 Drawing Sheets

COPY FEATURE FOR RECORDABLE DVD EDITING

CROSS REFERENCE TO RELATED APPLICATIONS

This Application claims the priority of U.S. provisional patent application No. 60/164,793 filed Nov. 10, 1999.

BACKGROUND OF THE INVENTION

1. Technical Field

The inventive arrangements relate generally to methods and apparatus providing advanced operating features for audio only, video only and both video and audio programs recorded on disc media, for example recordable digital video discs, hard drives and magneto optical discs.

2. Description of the Related Art

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded; that is, overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technologies. Reference herein to rewritable DVD technology, devices and methods is generally intended to encompass all of the standards which are now being used, as well as those which may be developed in the future.

Depending upon the standard that is eventually adopted, if any, certain recording schemes used to implement various advanced features will be compatible with all devices adhering to the standard, whereas other recording schemes may prove to be incompatible due to inconsistencies with the standard. Nevertheless, a particular proprietary advanced feature incompatible with other devices can still be very desirable from a consumer's point of view. The result is merely that a recording made in accordance with an incompatible advanced feature cannot be played back on the device of a different manufacturer, even if conventional recordings are fully compatible and portable.

In many cases, the program presentations are recorded in the viewer and/or listener's absence, for presentation at a later, more convenient time. This is referred to as time shifting the program. At other times, a program is being viewed and/or listened to without being recorded, and without any interest in a recording, but the viewer's and/or listener's attention is interrupted, for example by a telephone call or an unexpected visitor. If the viewer and/or listener is watching a television program, for example, and has a cassette tape in a VCR, or can retrieve and load such a cassette tape quickly, the program can be recorded. However, the viewer and/or listener cannot view and/or listen to the program in its entirety, and in a proper time sequence, until after the recording has been completed. The time to completion of the recording can be short or long, depending on the length of the program.

Although rewritable DVD technology is generally available, operation is limited to such basic functions as play, record, fast forward reverse and stop. Pause is available, but only as a counterpart to pause operation in a VCR, for example interrupting the play back of a prerecorded program or interrupting the recording of a viewed program to eliminate commercials from the recording. Unlike computer hard drives, recordable DVD devices have a very significant additional function, which is playing back prerecorded DVD's. Thus, there is an economic incentive to develop rewritable DVD technology, including methods and devices, that can be used instead of a computer hard drive. It is a challenge to provide such devices with improved, advantageous features without compromising the goal of decreasing costs and increasing sales.

DVD machines typically have a 1× read and 1× write capability. Such devices can typically have maximum data rates for recording or playing back of approximately 11 megabits/second. Thus, a key consideration for implementing certain copy functions for the purposes of the present invention is the relatively slow rate for reading and especially recording data on a DVD. This slow rate is attributable in large part to the nature of the mechanical assembly of conventional DVD devices and the limitations associated with reading and especially writing data to an optical disc.

For example, the high speed read access capability of conventional computer hard drives permit data to be read from discontinuous locations on the magnetic disc without any apparent interruption in the data. By comparison, with the relatively slower reading speed of a DVD, the data stream as physically located on the disc must be approximately continuous so as to avoid discontinuities in the playback of video or other media. Thus, a DVD copy feature requires data to physically be re-written to the proper location on the disc and cannot simply rely upon pointers or jump commands to physically separate areas of the disk.

It will be appreciated that in order to physically copy video data from one disk location to another as described above, a DVD device must have random access memory (RAM) for storing video data to be transferred. In fact, in order to accomplish this task efficiently, it is helpful to have as much RAM available as possible. However, inclusion of additional RAM in a DVD device adds expense which may not be acceptable to consumers. In fact, a key to the success of such DVD products is the ability of manufacturers to include new and useful features while continuing to reduce cost. Accordingly, a solution to the problem is required which allows the DVD copy feature to be implemented without the addition or expense of additional memory.

Rewritable DVD technology typically uses MPEG-2 encoders and decoders and many acronyms are encountered that are related to MPEG-2. The DVD standard, for example, calls for the video content of the disc to be divided up into video object units (VOBUs) in which each VOBU typically contains 0.4 to 1.0 seconds of presentation material. Each VOBU starts off with a navigation pack (NV_PCK or NAV_PACK). The navigation pack contains a lot of navigation information, some of which is very useful for trick modes. As used herein, trick modes refer to any operational mode for a recordable disc media other than the standard play mode. Thus, such modes can include reverse, fast forward, pause mode and so on.

The navigation pack includes presentation control information (PCI) and data search information (DSI). One example is the inclusion of the start addresses for many of the nearby VOBUs. This can facilitate jumping to the next VOBU forward or backward, or for a faster trick mode, to the second VOBU forward or backward, or to the third, etc. Another example is the inclusion of the end address for the first three reference pictures in the VOBU. This is the only clue given as to the structure of the VOBU.

Each video object set (VOBS) includes a plurality of video objects. Each video object includes a plurality of cells.

Each cell includes a plurality of VOBUs. Each of the VOBUs containing the video content of the disc typically contains 0.4 to 1.0 seconds of presentation material. A typical VOBU in a commercial movie contains 0.5 second of presentation material, corresponding to one group of pictures (GOP). Each VOBU is a sequence of packs in recording order. Each VOBU starts with exactly one navigation pack and encompasses all of following kinds of packs, including a video pack (V_PCK), an audio pack (A_PCK) and a sub-picture pack (SP_PCK).

Data search information (DSI) helps the decoder to find reference pictures within the VOBU corresponding to the current Nav_Pack. DSI also helps the decoder to find VOBUs far into the future or past of presentation data, relative to the current VOBU. The VOBUs in the past relative to the current VOBU presentation are referenced in fields of the Nav_Pack known as the BWDI (backward information). The VOBUs in the future relative to the current VOBU presentation are referenced in fields of the Nav_Pack known as FWDI (forward information). One example is the inclusion of the start addresses for many of the nearby VOBUs, up to +240 VOBU forward and −240 VOBU backward directions. This can facilitate jumping to the next VOBU forward or backward, or for a faster trick mode, to the second VOBU forward or backward, or to the third, etc. The video, audio, subpicture, presentation control information and data search information are the five components of the DVD bit stream.

SUMMARY OF THE INVENTION

A method is provided for copying a recorded series of bits from a first location to a second location on a rewritable disc media. The method includes the steps of selectively marking a beginning point and an end point of a segment of the recorded series of bits, and a location to which said segment is to be copied prior to said reading step. Subsequently, video data comprising at least a portion of the segment of the recorded series of bits to be copied is read from the disk and stored in a track buffer of a DVD device. At least part of the video data from the track buffer is subsequently transferred directly from the track buffer to the record buffer by a control processor of the DVD device. Finally, the portion of the video data stored in the track buffer is written to the second location.

According to one aspect of the invention, the method can include the step of modifying one or more of a navigation pack, video pack, audio pack and subpicture pack data so that such information for the copied segment is correct as to the second location. Similarly, the method can include modifying a VTSI and the VMGI on the disc containing the second location.

According to yet another aspect, the method can include the step of comparing a video format of the segment to a video format of the bit stream at the second location. Such a comparison allows the control CPU or processor to determine if the video format of the source is the same as the destination.

In an alternative embodiment, a DVD device is provided for copying a recorded series of bits from a first location to a second location on a rewritable disc media. The device includes suitable DVD read and write circuitry, and special programming for implementing the copy function as described herein. The device includes interface circuitry and software for permitting a user to selectively mark a beginning point and an end point of a segment of the recorded series of bits, and a location to which the segment is to be copied. The device includes circuitry and programming for reading from the disk video data comprising at least a portion of the segment of the recorded series of bits, and for storing such data in a track buffer of the DVD device. A control processor and suitable interface circuitry is provided for causing at least part of the video data from the track buffer to be subsequently transferred directly from the track buffer to the record buffer. The device further includes suitable circuitry and programming for causing the portion of the video data stored in the track buffer to be written to the second location.

According to one aspect of the invention, the device can include the circuitry and software for modifying one or more of a navigation pack, video pack, audio pack and subpicture pack data so that such information for the copied segment is correct as to the second location. Similarly, the device can include circuitry and any necessary software for modifying a VTSI and the VMGI on the disc containing the second location.

According to yet another aspect, the device can include the circuitry and processing capability for comparing a video format of the segment to a video format of the bit stream at the second location. Such a comparison allows the control CPU or processor to determine if the video format of the source is the same as the destination.

Finally, if the content comprising the video segment is still useful, it can be temporarily stored in an available memory space until it is overwritten. Thus, this segment can remain in memory to be copied to another location, should the user so desire.

DETAILED DESCRIPTION OF THE PREFERRED EMBODIMENTS

Recordable DVD Device

Figure 1:
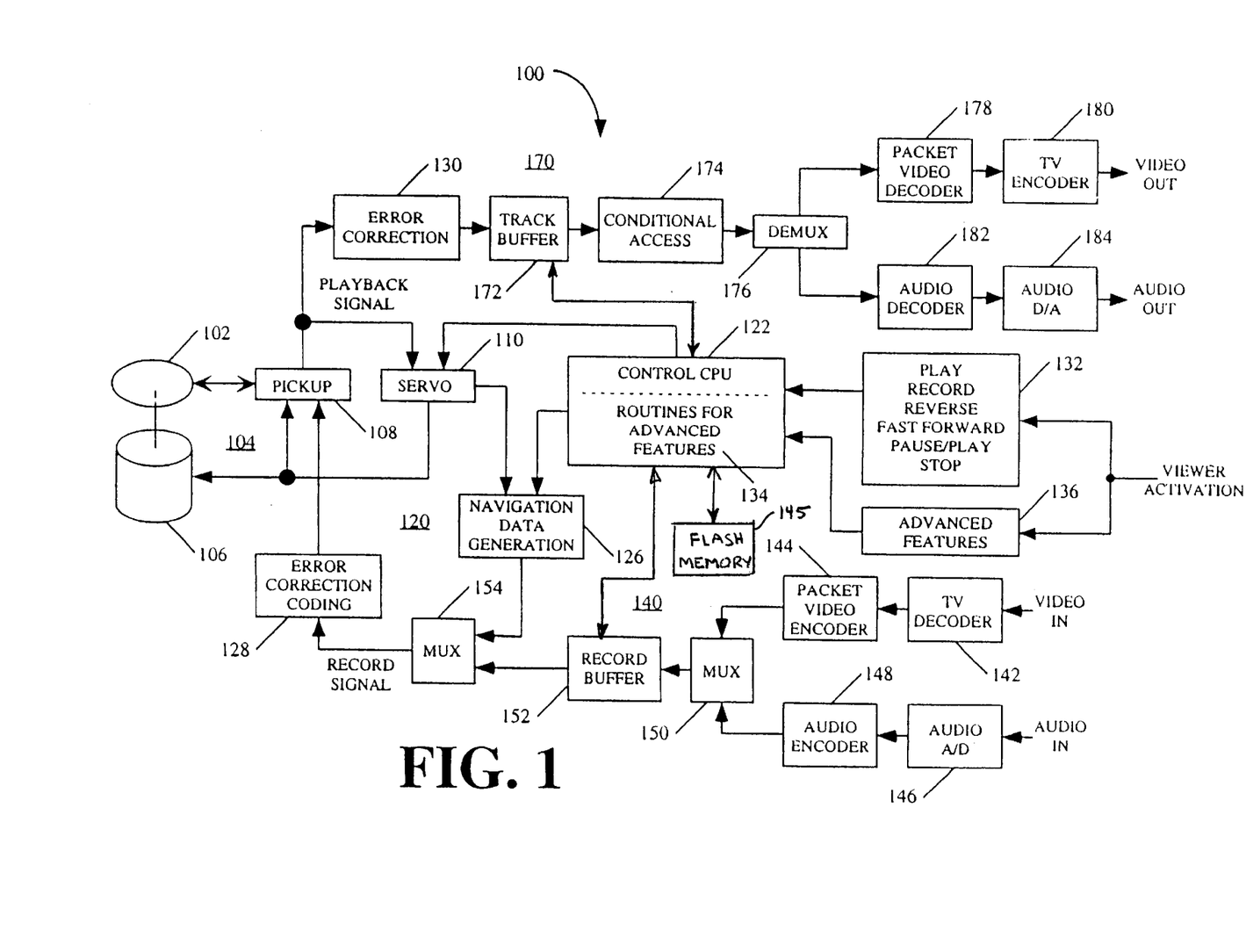
FIG. 1 is a block diagram of a rewritable DVD device that can be provided with one or more advanced operating features in accordance with the inventive arrangements.

A device 100 for implementing the various advanced operating features in accordance with the inventive arrangements taught herein utilizes a rewritable disc medium 102 in accordance with the inventive arrangements is shown in block diagram form in FIG. 1. The rewritable disc medium 102 is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disc. A laser on the pickup assembly burns spots onto a spiral track on the disc or illuminates spots already burned onto the track for recording and playing back video and/or audio program material. For purposes of understanding the invention, it is irrelevant whether the disc is recordable on one or two sides, or in the event of a double-sided recording, whether the double-sided recording, or subsequent reading from the disc, takes place from the same side of the disc or from both sides. The pickup and the motor are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140. The output of the MUX 154 is an input to an error correction coding circuit 128. The output of the error correction coding circuit 128 is a recordable input signal supplied to the pickup 108, which will be "burned" onto the spiral track of the disc 102 by the laser.

The control CPU 122 also preferably has access to the data contained in the track buffer 172 and record buffer 152 as shown in FIG. 1. CPU 122 can delete, modify, and reformat video data stored in the track buffer 172 and record buffer 152 for the purpose of implementing the inventive arrangements. Suitable software or firmware is provided in memory for the conventional operations performed by control CPU 122. In addition, program routines for the advanced features 134 are provided for controlling CPU 122 in accordance with the invention as shall hereinafter be described in greater detail.

A control buffer 132 for viewer activatable functions indicates those functions presently available, namely play, record, reverse, fast forward, pause/play and stop. The pause is a counterpart to pause operation in a VCR, for example manually interrupting the play back of a prerecorded program or interrupting the recording of a viewed program to eliminate commercials from the recording. A separate buffer 136 is provided to receive commands for implementing the inventive arrangements taught herein.

The video/audio input processing path 140 is a signal processing circuit for converting a conventional television signal, for example NTSC or PAL, into digitized packet data, for example. MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As groups of packet are constructed, they are combined with the output of the navigation data generation circuit in the MUX 154 and sent to the error correction coding circuit 128. Error correction coding circuit 128 can also be deemed to be part of the input path 140.

As a practical matter, the smallest addressable unit on the spiral track of a DVD is an ECC (error correction code) block of 16 sectors, where each sector includes 2048 bytes of user data. A group is a number of ECC blocks, for example 12. Each group of blocks represents approximately 0.5 seconds of combined video and audio program material. The amount of linear space along the spiral track needed to record a group of ECC blocks, for example 192 sectors, is defined herein as a segment of the spiral track. Accordingly, it can appear that the record buffer needs to be only large enough to store one segment of data. One segment of data can correspond, for example, to approximately 0.5 seconds of audio and video program material.

The output processing path 170 comprises error correction block 130 and a track buffer, or output buffer, 172, in which data read from the disc is assembled into packets for further processing. The packets are processed by conditional access circuit 174 that controls propagation of the packets through demultiplexer 176 and into respective paths for video and audio processing. Accordingly, it can also appear that the track buffer 172 needs to be only large enough to store one segment of data, also corresponding to approximately 0.5 seconds of audio and video program material.

The video is decoded by decoder 178, for example from MPEG-1 or MPEG-2, and encoded as a conventional television signal, for example NTSC or PAL. The audio is decoded by circuit 182, for example from MPEG-1 or MPEG2, and converted to analog form by audio digital-to-analog (D/A) converter 184. The output processing path 170 can be deemed to include the error correction circuit 130, as noted.

DVD Media

Figure 2:
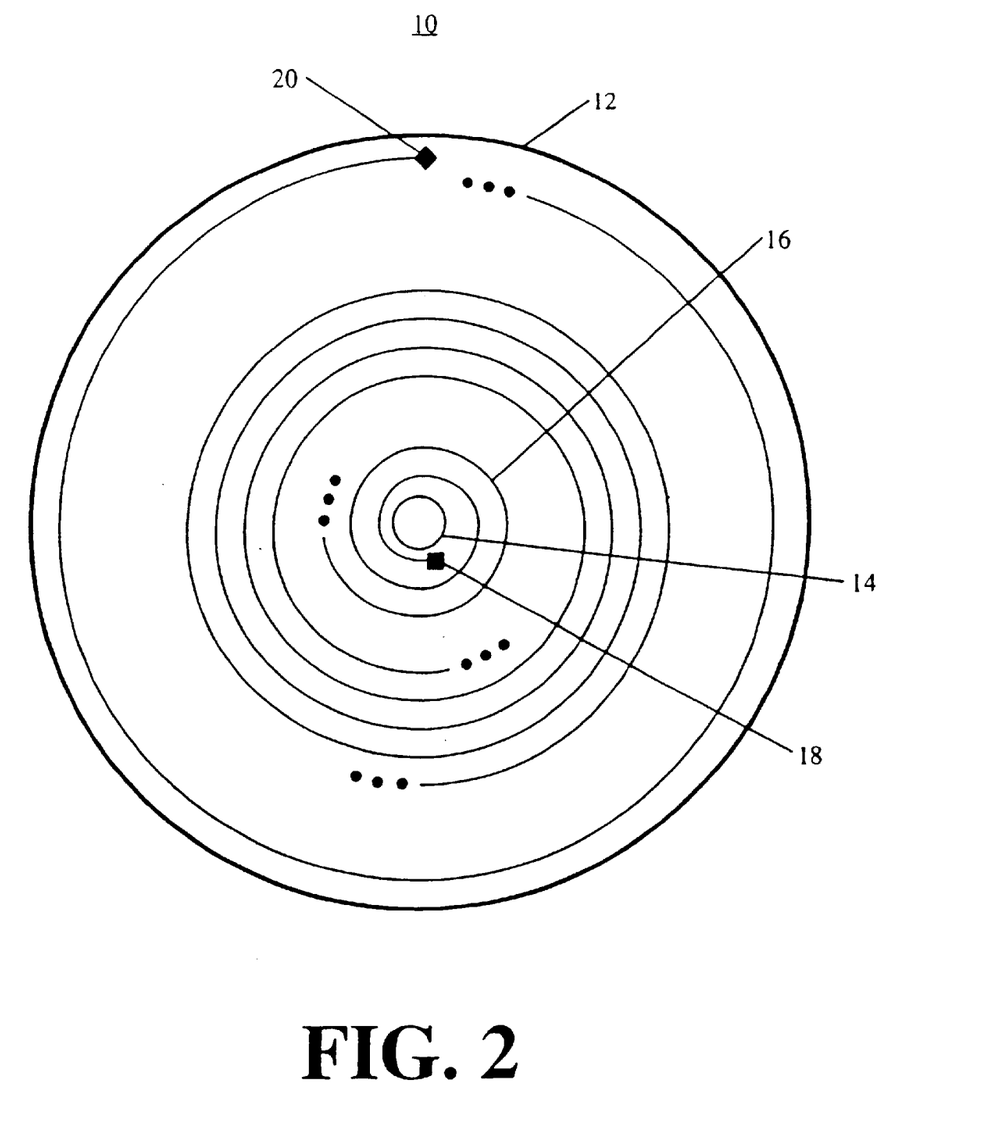
FIG. 2 is a diagram useful for illustrating the spiral track on a rewritable DVD.

For purposes of illustrating the inventive arrangements, program material can be recorded onto a rewritable DVD and played back from a rewritable DVD. A rewritable DVD 10 shown in FIG. 2 is suitable for use as disc 102 in device 100. The disc 10 is formed by a flat, round plastic plate-like member 12 having a hole 14 in the middle. The direction of recording on the track is typically outwardly along a spiral track 16, from a smaller radius part of the spiral to a larger radius part of the spiral. The several series of three large dots (. . .) denote portions of the track not shown in the drawing. As a result, the beginning of the spiral track is deemed to be near the hole 14, and is denoted by square 18. The end of the spiral is deemed to end near the rim, and is denoted by diamond 20. Those skilled in the art generally accept defining the beginning and end of the spiral as noted. Certain advanced features in accordance with the inventive arrangements utilize backward recording, that is, from a larger radius part of the spiral to a smaller radius part of the spiral. The track can also have a side-to-side wobble, not shown in the drawing, to accommodate media type indexing. Due to difficulties of scale only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

It is often necessary to jump back one revolution of the track during operation due to the rotational speed of the disc medium being higher than needed. This is a common technique understood by those skilled in the art.

Figure 3:
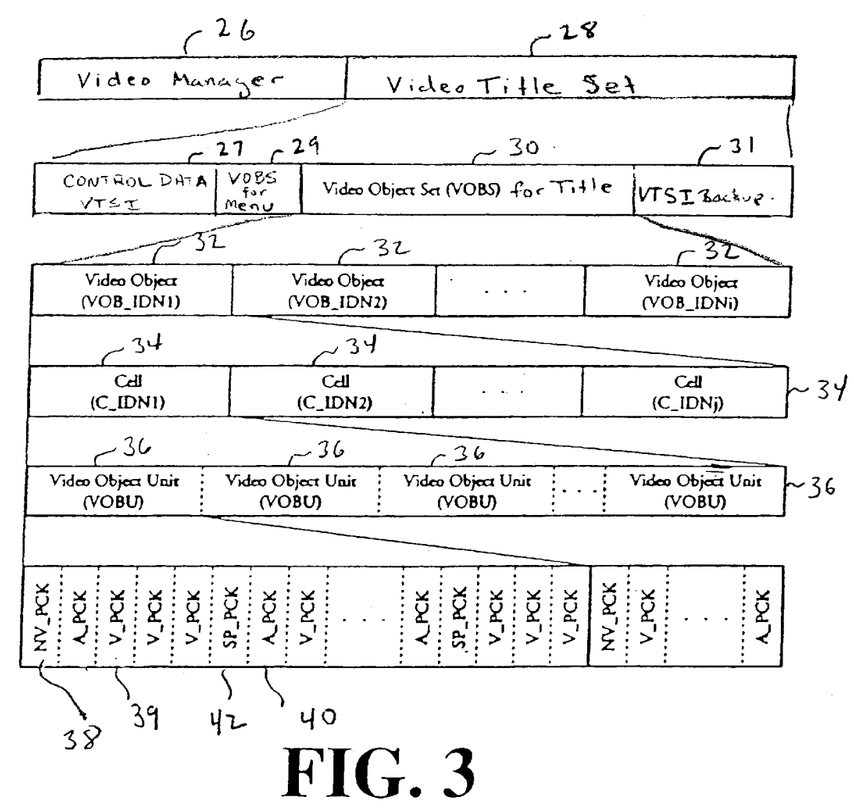
FIG. 3 is a diagram useful for explaining the organization of video disc.

As shown in FIG. 3, each DVD contains a video manager 26 and video title set (VTS) 28. The VTS includes video title set information (VTSI) 27, an optional video object set for menu 29, one or more VOBS for title 30 which contains the actual title content and a VTSI backup 31. Each VOBS 30 is comprised of a plurality of video objects 32. Each video object 32 includes a plurality of cells 34. Each cell includes a plurality of VOBUs 36. Each of the VOBUs 36 in which the video content of the disc resides typically contains 0.4 to 1.0 seconds of presentation material. Each VOBU 36 is a sequence of packs 38 in recording order. Each VOBU starts with exactly one navigation pack and could encompass all of following kinds of packs, including video packs (V_PCK), audio packs (A_PCK) and sub-picture packs (SP_PCK).

The VTSI 28 contains control data including the start and end addresses for all cells 34 and video object units 36. The VTSI can also includes jump commands where appropriate for moving from one VOBU to another, or from one cell to another. Those skilled in the art will be familiar with such jump commands as they are defined in the DVD specification. The jump command ensure continuity of program playback and direct the reading of data at various locations on the disc.

Various modifications of the device illustrated in FIG. 1 and the disc medium illustrated in FIG. 2 can be used together to implement the advanced features taught herein in accordance with the inventive arrangements. It will be appreciated that the advanced features taught herein are applicable to other kinds of disc media and disc media players and recorders.

A valid DVD program stream is segmented into presentation units known as VOBUs. Each VOBU is punctuated by its first pack being a navigation pack (Nav_Pack), and the remaining packs consist of associated video, audio, and user presentation data packs. The Nav_Pack contains presentation control information as well as data search information. The data search information is useful in performing "trick" modes of playback, that is, any mode other than normal play, stop and pause. One aspect of data search information (DSI) is that it helps the decoder to find reference pictures within the VOBU corresponding to the current Nav_Pack. Another aspect of the DSI is that it helps the decoder to find VOBUs far into the future or past of presentation, relative to the current VOBU. The VOBUs in the past relative to the current VOBU presentation are referenced in fields of the Nav_Pack known as the BWDI (backward information). The VOBUs in the future relative to the current VOBU presentation are referenced in fields of the Nav_Pack known as FWDI (forward information).

Copy, Feature For Recordable DVD Editing

Recordable DVD has to have some editing features in order to let the consumer make their own home videos, such as wedding, birthday party, etc. Consumers may wish to copy portions of recorded video for use in different video presentations. In this regard a COPY function is provided in accordance with the inventive arrangements for a DVD recorder. The COPY function is used to copy a segment either within a disc or from a disc to another disc. This function provides the ability to edit a bit stream on a recordable DVD disc. The copy function is very useful for personal screen saver, photocopy, and more.

Due to the relatively slow access times for reading and writing data to a DVD, it is not practical to rely upon pointers or jump commands to direct reading of data from physically separate areas of the disk. Such jumps will cause discontinuities in the video playback. Instead, copying requires data to physically be re-written to the new location on the disc if a seamless presentation is desired. In order to accomplish this task efficiently, it is helpful to have as much RAM available as possible for storing data to be copied, without increasing the cost of the DVD device.

In accordance with the inventive arrangements, the foregoing problem is solved by designing the DVD recorder as shown in FIG. 1 so that the control CPU 122 can access both the record buffer 152 and the track buffer 172 (also referred to as the play of reading buffer). The size of record buffer 152 and the track buffer 172 are relatively small compared to the large amount of video data on the disc. For example a typical DVD device may have only 128 Mbit of RAM which is used for the track buffer and record buffer. However, if the copy command does not need to be implemented in real time, then this minimal amount of memory can be sufficient for allowing the copy feature to be implemented without the addition of any significant hardware costs.

Figure 4:
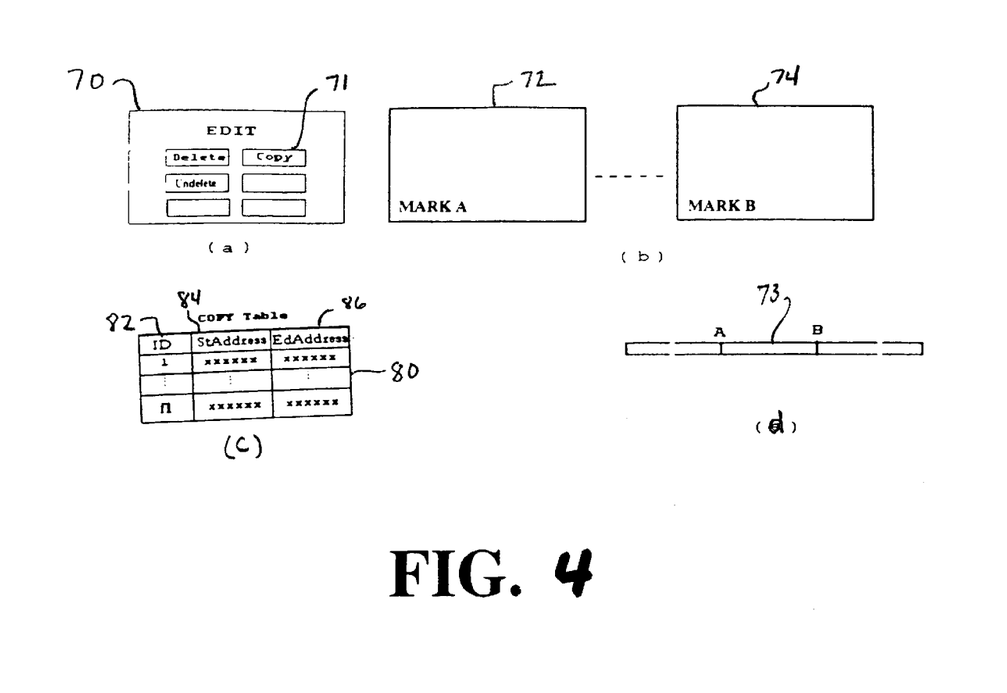
FIGS. 4(a) through 4(d) are useful for explaining a copy feature in accordance with the inventive arrangements.
Figure 5:
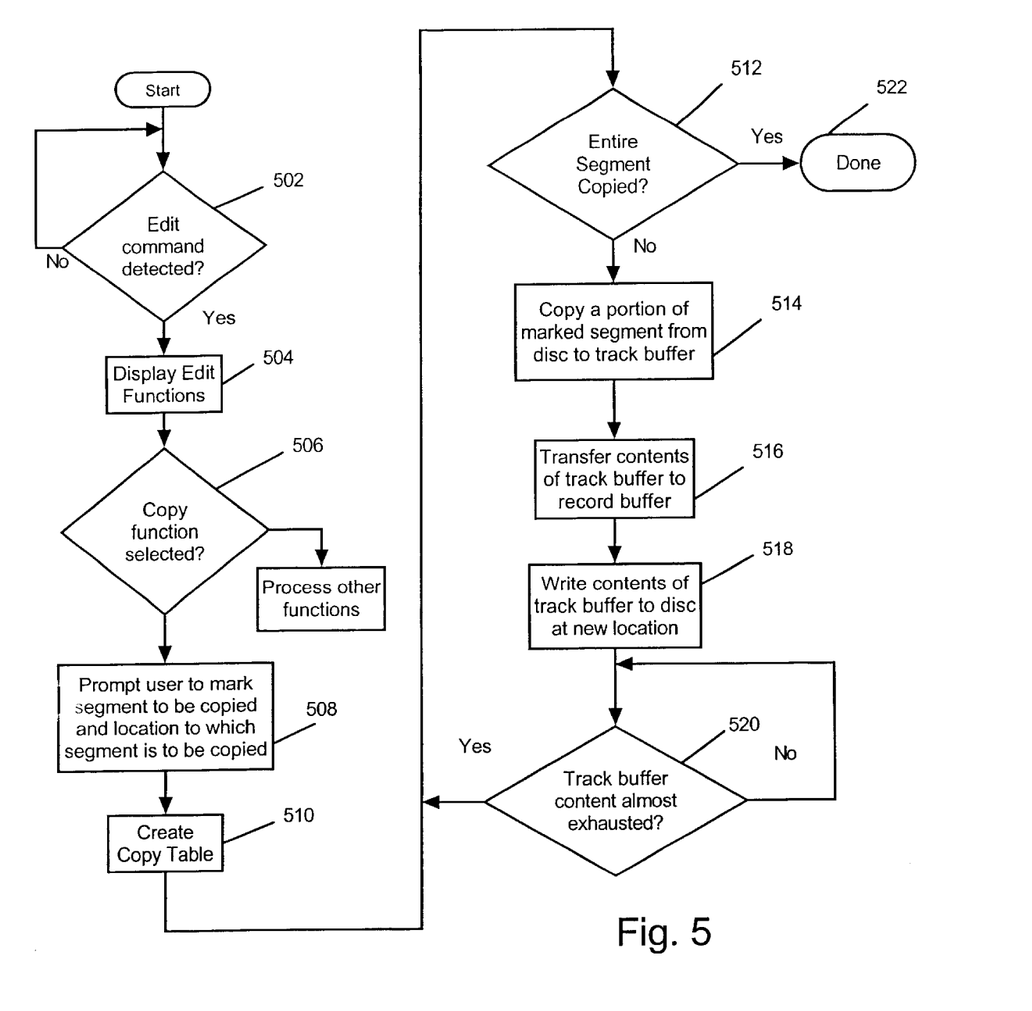
FIG. 5 is a flow chart useful for explaining the process for the copy feature in accordance with the inventive arrangements.

FIG. 5 is a flow chart illustrating the process for implementing the DVD copy feature according to the present invention. For the purpose of implementing an edit feature, an EDIT button can be provided on a remote control device. When the button EDIT is pressed, it is detected in step 502. In response thereto, a screen 70 can be displayed in step 504 with EDIT as a title and some or all the editing functions, such as DELETE, COPY, UNDELETE, etc. as shown in FIG. 4(*a*). The screen can be displayed on a display device integrated into the DVD device or on an associated video monitor to which the DVD displays video presentations.

The COPY function requires marking the segment that will be copied and indicating the disc location where the segment is to be inserted. According to one embodiment, if a COPY button 71 is selected in step 506, then the user is requested in step 508 to enter a mark 72, 74 at the beginning and at the end of the segment that will be copied, as shown in FIG. 4(*b*). In step 508 the user is also preferably prompted to indicate the location where the copied segment is to be inserted. Marking can be accomplished by any suitable method which provides a reliable and accurate indication of the location where the segment begins and ends. According to a preferred embodiment, marking can be accomplished by storing in a memory location associated with control CPU 122 a disc sector number or an address identifying the beginning of a VOBU 36. However, the precise mode of marking is not critical and any other suitable method can be selected for this purpose. Trick mode can be used to allow the user to scan the program for marking the beginning and end points.

FIG. 4(*d*) is a representation of a bit stream showing a segment 73 which has been marked by a user to be copied in accordance with step 508. After the segment 73 is marked, a screen (not shown) can be displayed to enable confirmation of the edit. If the edit is confirmed, a COPY Table 80 is created in step 510 which can be used in accordance with the inventive arrangements to perform the COPY function. According to a preferred embodiment, the information concerning the segment 73 to be copied can be stored in memory in a COPY Table as shown in FIG. 4(*c*). The COPY Table 80 can include a segment identification name 82, a copied segment start address 84 and a copied segment end address 86.

When copying, control CPU 122 causes relatively small portions of segment 73 to be read from DVD 102 in step 514 and stored in the track buffer 172. The portions of data read from the disc are preferably selected so that they approximately fill the track buffer RAM 172. The contents of the track buffer 172 can then be transferred to the record buffer 152 in step 516. The contents of the track buffer are then physically written in step 518 to the new location on the DVD 102. When the CPU determines that most of the contents of the record buffer 152 have been transferred to the DVD 102, then in step 520 the CPU can direct the DVD device 100 to read an additional portion of the segment 73. In step 512, the CPU determines whether the entire segment 73 has been copied from the disc to the track buffer. If not, then the process continues as shown in steps 514 through 520. However, in step 512, if the entire content of the segment is determined to have been copied to the new location on the disk then so, the process is completed in step 522.

Referring again to FIG. 1, flash memory 145 may be included in certain DVD devices 100. Such memory is used for implementing certain features such as downloading internet data or MP3 files. For example, the flash memory for MP3 files can be 32 Mbytes or 64 Mbytes in size. Thus, in accordance with an alternative embodiment of the inventive arrangements, the copy problem can also be solved with minimal additional expense by using such flash memory to store the video data segment 73 which is to be copied.

Although not necessarily as fast as conventional high speed RAM, such flash memory 145 may nevertheless be used as a suitable video buffer, particularly if the copy function does not need to be implemented in real time.

If flash memory is used, a segment 73 can be divided into several pieces as described above, and each piece can be held in the flash memory. The data between start address and end address is read into the flash memory, and then written onto the new location of the disk, until all data is copied. Then the COPY Table is discarded.

According to a preferred embodiment of the invention, copyright and picture size issues are addressed as part of the copy process. If the program material is copyrighted, a warning can be displayed and the copy process can be terminated. If the picture size and video format of the source video are different from that of the destination, a warning can be given, and the copy process can be terminated by the user. The copyright and video format verification steps are preferably performed prior to creating the Copy table 80. However, the invention is not limited in this regard.

During the copy process, it can become necessary to alter one or more of the navigation packs, the video packs, the audio packs and subpicture pack. Such alterations are necessary so that the information contained therein is correct relative to the new location of the segment 73 on the disc. In this regard, it will be appreciated that the insertion of segment 73 within a bit stream may in some instance require shifting of existing data associated with a video presentation to maintain continuity of playback. For example, when the segment 73 is inserted in the middle of a video presentation, the video data in the bit stream following the insertion point will need to be moved to make room for the new data.

Similarly, those skilled in the art will readily appreciate that after the copy process is completed, it can become necessary to alter the cell information, the VTSI, the VMGI and the disk size data.

We claim:

1. A method for copying a recorded series of bits from a first location to a second location on a rewritable disc media comprising:

reading video data comprising at least a portion of a segment of said recorded series of bits to be copied and storing said video data in a track buffer of a DVD device;

transferring at least a portion of said video data from said track buffer to a record buffer of said DVD device;

writing said portion of said video data to said second location.

2. The method according to claim 1 wherein said data is transferred directly from said track buffer to said record buffer by a control processor.

3. The method according to claim 1 further comprising selectively marking a beginning point and an end point of a segment, and a location to which said segment is to be copied prior to said reading step.

4. The method according to claim 1 wherein at least one of a navigation pack, video pack, audio pack and subpicture pack data is modified for said second location, before said writing step.

5. The method according to claim 4 wherein at least one of a VTSI, and the VMGI are corrected on said disc containing said second location after said segment has been copied to said second location.

6. The method according to claim 1 further comprising the step of comparing a video format of said segment to a video format of said bit stream at said second location to determine if said video format of said source is the same.

7. A device for copying a recorded series of bits from a first location to a second location on a rewritable disc media comprising:

means for reading video data comprising at least a portion of a segment of said recorded series of bits to be copied and storing said video data in a track buffer of a DVD device;

means for transferring at least a portion of said video data from said track buffer to a record buffer of said DVD device;

means for writing said portion of said video data to said second location.

8. The device according to claim 6 wherein said data is transferred directly from said track buffer to said record buffer by a control processor.

9. The device according to claim 6 further comprising means for selectively marking a beginning point and an end point of said segment, and a location to which said segment is to be copied.

10. The device according to claim 1 further comprising means for correcting at least one of a navigation pack, video pack, audio pack and subpicture pack data for said second location.

11. The device according to claim 10 further comprising means for modifying at least one of a VTSI, and the VMGI on said disc containing said second location after said segment has been copied to said second location.

12. The device according to claim 1 further comprising means for comparing a video format of said segment to a video format of said bit stream at said second location to determine if said video format of said source is the same.

* * * * *